July 28, 1964 F. PLUMETTAZ 3,142,313
BYPASS SHUT-OFF VALVE FOR A PIPELINE
Filed June 20, 1961 2 Sheets-Sheet 1

INVENTOR
FERNAND PLUMETTAZ

BY
Cushman, Darby & Cushman
ATTORNEYS

July 28, 1964 F. PLUMETTAZ 3,142,313
BYPASS SHUT-OFF VALVE FOR A PIPELINE
Filed June 20, 1961 2 Sheets-Sheet 2

INVENTOR.
Fernand Plumettaz
BY
Cushman, Darby & Cushman
attorneys

United States Patent Office 3,142,313
Patented July 28, 1964

3,142,313
BYPASS SHUT-OFF VALVE FOR A PIPELINE
Fernand Plumettaz, Bex, Switzerland, assignor to Plumettaz Societe Anonyme, Bex, Canton of Vaud, Switzerland
Filed June 20, 1961, Ser. No. 118,293
Claims priority, application Switzerland June 28, 1960
4 Claims. (Cl. 137—599.2)

This invention relates to a bypass shut-off valve for a pipeline, which is characterised in that it comprises a casing having two apertures intended to be connected to two elements of the said pipeline and, internally, a cavity having two apertures communicating with the two apertures of the casing, said cavity serving as a housing for a shut-off element mounted rotatably and comprising two conduits intended to connect the inside of the casing to two apertures in the latter, one of which apertures is intended to feed a pump while the other is intended to be fed by the said pump, means being provided to enable the shut-off element to be rotated, the whole being so arranged that in one position of the shut-off element the pump is in circuit with the pipeline while in another position of the said element the pump is out of circuit, the liquid which moves through the pipeline then passing only through the shut-off element.

The accompanying drawing illustrates two embodiments of the shut-off element according to the invention by way of example.

Figure 1:
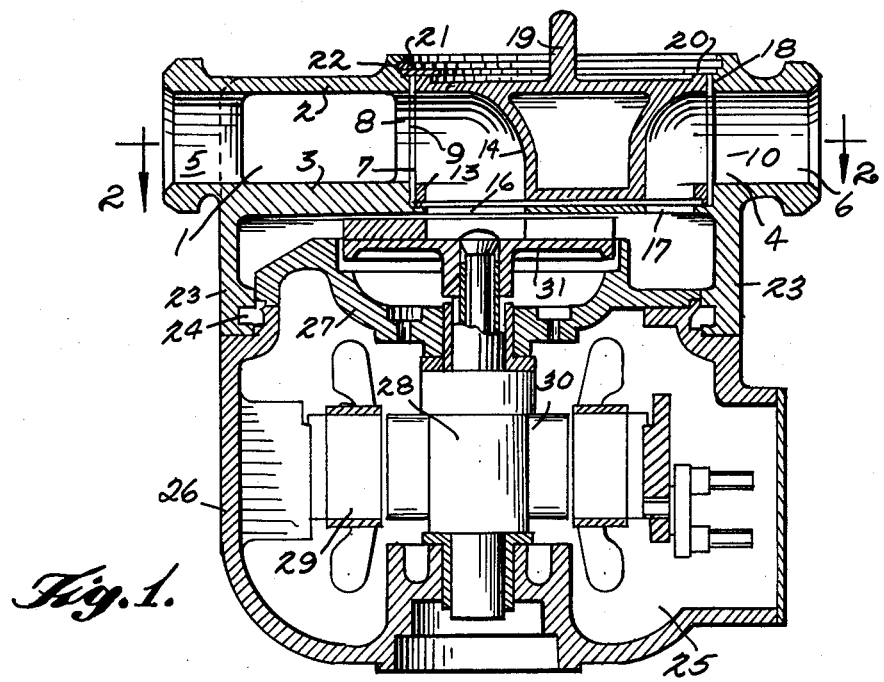
Figure 2:
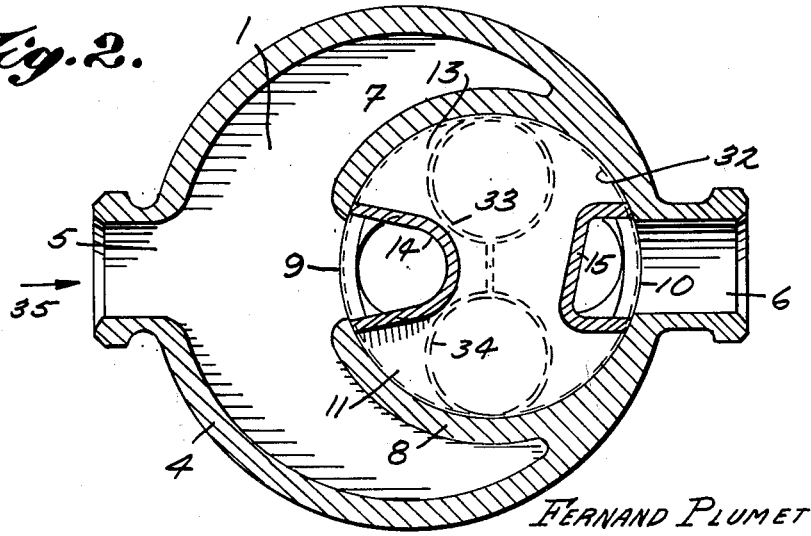
Figure 3:
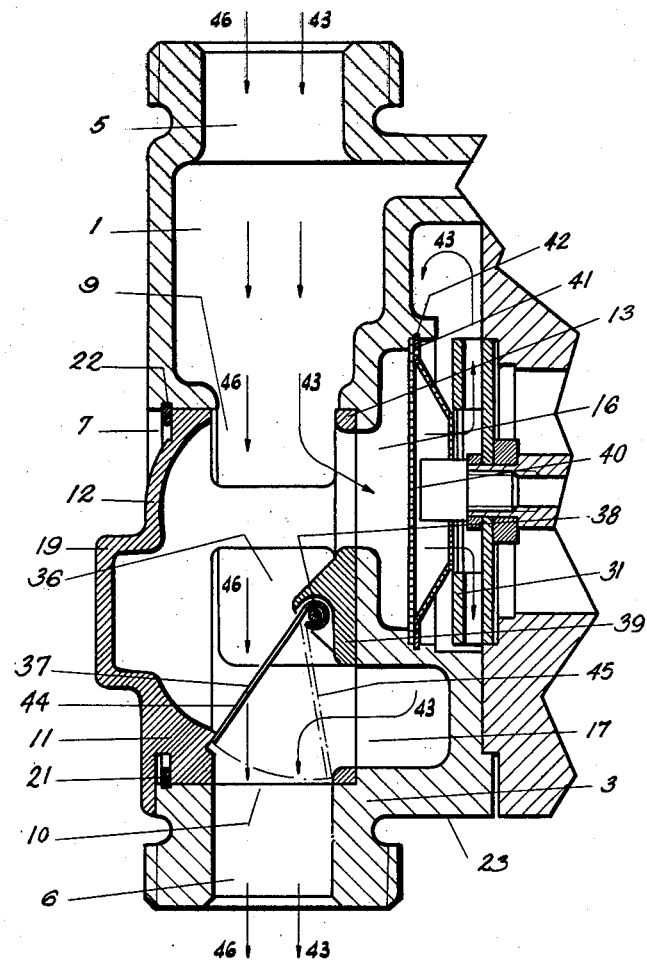

FIGURE 1 is an axial section of one embodiment.
FIGURE 2 is a section on the line II—II in FIGURE 1.
FIGURE 3 is a diagrammatic section in elevation showing an alternative embodiment.

The bypass shut-off valve shown in FIGURES 1 and 2 comprises a casing 1 having two facing walls 2 and 3 connected to one another by a lateral wall 4 of a generally circular shape, the latter being pierced by two apertures 5 and 6 intended to be connected to two elements of a pipeline.

Internally, the casing 1 has a cavity 7 bounded by a side wall 8 of a generally circular shape which is connected to the aforesaid walls 2 and 3; this cavity 7, which has two apertures 9 and 10 communicating with the apertures 5 and 6 of the casing 1, serves as a housing for a shut-off element 11; the latter comprises two parallel circular walls 12 and 13 and two conduits 14 and 15, one of the ends of the latter leading to the periphery of the walls 12 and 13 while their other end, passing through the wall 13, is intended to register with the apertures 16 and 17 respectively in the wall 3 of the casing 1. The wall 2 of the latter has a circular aperture 18 in which is fitted the said wall 12 comprising a manipulator 19; a ring 20 bears freely on said wall 12 and is kept in place by a resilient ring 21 housed in a groove 22 formed in the wall 2.

On the outside, the wall 3 of the casing 1 has perpendicularly a circular attachment 23 on which a casing 25 in two parts 26 and 27 is mounted detachably by means of a ring 24; an electric motor 28 comprising a stator 29 and a rotor 30 is fitted rotatably in said casing 25. The rotor is coupled to a centrifugal pump 31 disposed opposite the aperture 16 of the wall 3 of the casing 1.

At its periphery the wall 13 has a sealing lip or rim 32 opposite the wall 3 and intended to rub against the inner surface of the latter; two circular lips 33 and 34 formed on the wall 13 are also intended to rub against the surface of the wall 3 and are tangential to the lips 32 and have a common diameter so that when the shut-off element 11 is operated for the purpose they are intended to ensure that the shutting-off of the apertures 16 and 17 is sealing-tight.

The bypass shut-off valve shown in FIGURES 1 and 2 is intended more particularly for a central-heating pipeline and operates as follows:

During normal operation, the water moves in the direction of the arrow 35 in the casing 1; it passes through the conduit 14, is driven by the pump 31 towards the conduit 15 and escapes through the aperture 6; when a repair or maintenance operation has to be carried out on the motor 28 or the pump 31, the shut-off element 11 is moved rotatably by means of the manipulator 19 so that the conduit 14 no longer connects the aperture 9 to the aperture 16 and the conduit 15 no longer connects the aperture 17 to the aperture 10, the wall 13 of the element 11 then being opposite the apertures 16 and 17, sealing-tightness of the shutting off of the latter being effected by the lips 33 and 34 respectively; the water then moves in the casing 1 in the direction of the arrow 35 while passing through the aperture 5, the aperture 9, between the walls of the conduits 14 and 15, the aperture 10 and the aperture 6; without any interruption to the circulation of water in the corresponding pipeline, the casing 25 can then be dismantled and the required repair carried out.

In a second embodiment, provision is made for the bypass shut-off valve to be such that in the position in which the pump is put in circuit on the pipeline the shut-off element presents a direct passage to the liquid moving in the pipeline, this passage being shut off by a valve when the pump comes into action, said valve automatically freeing the said passage in the event of accidental stoppage of the pump.

This shut-off device is shown diagrammatically in FIGURE 3 and comprises a casing 1 formed with two apertures 5 and 6 intended for connection to two elements of a pipeline. The casing 1 has on the inside a cavity 7 with two apertures 9 and 10 communicating with the apertures 5 and 6 in the casing 1. The cavity 7 serves as a housing for a shut-off element 11 which is held in place by a resilient ring 21 housed in a groove 22 formed in the wall of the cavity 7. The wall 3 of the casing 1 has on the outside a circular attachment 23 in which is mounted a centrifugal pump 31 driven by an electric motor (not shown), said pump being disposed opposite the aperture 16 of the wall 3 of the casing 1.

The shut-off element 11 has a top wall 12 provided with a manipulator 19 and a bottom wall 13 comprising apertures and sealing means (not shown) and intended to open or close the apertures 16 and 17 of the wall 3 of the casing 1 depending on the position of the shut-off element 11. Between the walls 12 and 13 of the shut-off element 11 is a duct 36 adapted to be closed by a valve 37 movable on a spindle 38 fitted in a projection 39 on the bottom wall 13 of the shut-off element 11.

Provision is made for the fitting of a filter 40 of wire gauze or any other suitable material, at the inlet of the centrifugal pump 31, said filter being held in place by a resilient ring 41 inserted in a groove 42 in the wall 3 of the casing 1.

The bypass shut-off valve shown in FIGURE 3 is intended more particularly for fitting on a central-heating pipeline and operates as follows:

When the shut-off element 11 is in the position in which the pump 31 is connected to the pipeline, the water is drawn in by the pump 31 through the aperture 16 and driven through the aperture 17 in the direction of the arrows 43. Under the thrust of the water delivered by the pump the valve 37 shuts off the duct 36 (position 44 of the said valve). If for some reason, such as a current failure, breakdown or some other reason, the pump 31 stops, the valve 37 no longer undergoes the thrust of the water delivered by the pump through the aperture 17 and thus frees the duct 36 (position 45 of the said valve), and the water passes directly through the said duct 36 in the direction of the arrows 46. The shut-off device then acts as a bypass and the heating operates by thermo-siphon.

What I claim is:

1. A pump provided with a bypass shut-off valve comprising: a first casing having disposed therein the rotor of said pump, said first casing being removably mounted on a second casing having two apertures designed for connection with two elements of a pipeline and terminating in a cavity, said cavity serving as a housing for a rotatably mounted shut-off element and comprising two conduits serving to connect said apertures with the inlet and the outlet of said pump, means for rotating said shut-off element whereby at one position of said element the pump is in circuit with said pipeline and at another position of said element liquid moving in said pipeline passes only through the shut-off element, and a valve pivotally mounted in a passage connecting the conduits of said shut-off element, said passage being closed by said valve when said pump is actuated and said passage being automatically opened when said pump is deactuated.

2. A pump according to claim 1 characterized in that said first casing cooperates with said cavity.

3. A pump according to claim 1 characterised in that the shut-off element is held in the corresponding housing by means of a collar and a resilient ring fixed on the wall of the casing.

4. A bypass shut-off valve for a pipeline, characterised in that it comprises a casing having two apertures intended to be connected to two elements of the said pipeline and, on the inside, a cavity having two apertures communicating with the two apertures of the casing, said cavity serving as a housing for a shut-off element mounted rotatably and comprising two conduits intended to connect the inside of the casing to two apertures of the latter, one of which is intended to feed a pump while the other is intended to be fed by the said pump, means being provided to enable the shut-off element to be rotated, the whole being so arranged that in one position of the said shut-off element the pump is in circuit with the pipeline while in another position of the said element the pump is out of circuit and the liquid moving in the pipeline passes only through the shut-off element, said pump being provided with a detachable filter disposed at the inlet to the pump so as to be accessible on dismantling of said pump.

References Cited in the file of this patent

UNITED STATES PATENTS

| 461,235 | Butler | Oct. 13, 1891 |
| 631,868 | Fowler | Aug. 29, 1899 |
| 940,920 | Burhorn | Nov. 23, 1909 |
| 1,612,685 | Wittmann | Dec. 28, 1926 |
| 1,694,694 | Walker | Dec. 11, 1928 |

FOREIGN PATENTS

| 92,795 | Netherlands | Nov. 16, 1959 |